United States Patent [19]

Solomon, II

[11] Patent Number: 5,423,705
[45] Date of Patent: Jun. 13, 1995

[54] FLYING DISC WITH LAMINATE SURFACING

[75] Inventor: Ronald H. Solomon, II, Lafayette, Calif.

[73] Assignee: Kransco, San Francisco, Calif.

[21] Appl. No.: 219,025

[22] Filed: Mar. 28, 1994

[51] Int. Cl.⁶ .................... A63H 27/00; B29C 45/16; B29C 43/18
[52] U.S. Cl. ...................... 446/46; 264/247; 264/266
[58] Field of Search .................... 446/46–48; 273/424, 425, 428; 264/511, 259, 266, 247

[56] References Cited

U.S. PATENT DOCUMENTS

| | | | |
|---|---|---|---|
| 2,619,679 | 12/1952 | Baldanza | 264/247 |
| 3,270,101 | 8/1966 | Jardine et al. | 264/247 X |
| 3,359,678 | 12/1967 | Headrick | 446/46 |
| 3,654,062 | 4/1972 | Loew | 264/259 X |
| 3,710,505 | 1/1973 | Linenfelser | 446/46 |
| 3,839,129 | 10/1974 | Neumann | 264/247 X |
| 4,176,843 | 11/1979 | DeWitt, Jr. | 273/424 X |
| 4,204,357 | 5/1980 | Harrington | 273/424 X |
| 4,334,385 | 6/1982 | Melin et al. | 446/46 |
| 4,342,716 | 8/1982 | Fishbaugh et al. | |
| 4,351,129 | 9/1982 | Kerkenbush et al. | 446/46 |
| 4,360,329 | 11/1982 | Hatakeyama | 264/247 X |
| 4,369,157 | 1/1983 | Conner | 264/266 X |
| 4,503,635 | 3/1985 | Harrington | 446/46 |
| 4,710,338 | 12/1987 | Bagnall et al. | 264/259 X |
| 4,795,597 | 1/1989 | Whiteley et al. | 425/444 X |
| 4,985,194 | 1/1991 | Watanabe | 264/247 |
| 4,994,224 | 2/1991 | Itoh et al. | 264/247 |
| 5,032,098 | 7/1991 | Balogh et al. | 446/47 |
| 5,096,652 | 3/1992 | Uchiyama et al. | 264/511 |
| 5,154,872 | 10/1992 | Masui et al. | 264/266 |

FOREIGN PATENT DOCUMENTS 56-5747  6/1979  Japan ................ 264/266

Primary Examiner—Mickey Yu
Attorney, Agent, or Firm—Kolisch, Hartwell, Dickinson, McCormack & Heuser

[57] ABSTRACT

A flying disc having a disc body of thermoplastic injection molded material, and a laminate layer integrally joined to the disc body and forming the exterior of the disc. The laminate layer includes an outer clear lamina and an inner white and opaque lamina, and imaging material sandwiched between the lamina. A groove extending about a rim portion in the disc bounds an edge in the laminate layer.

6 Claims, 3 Drawing Sheets

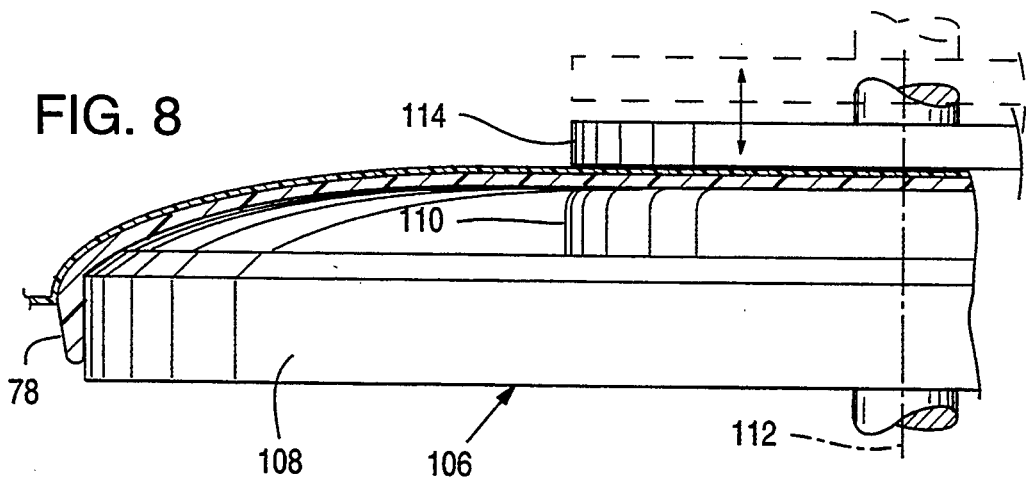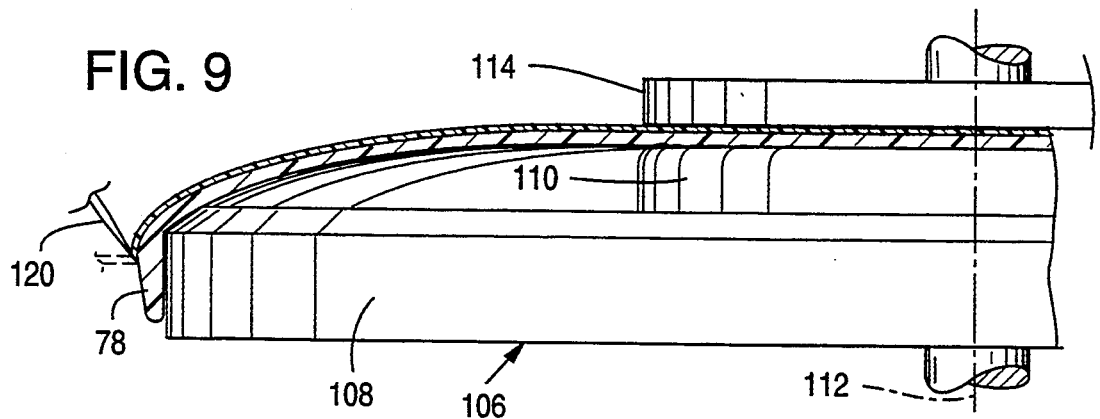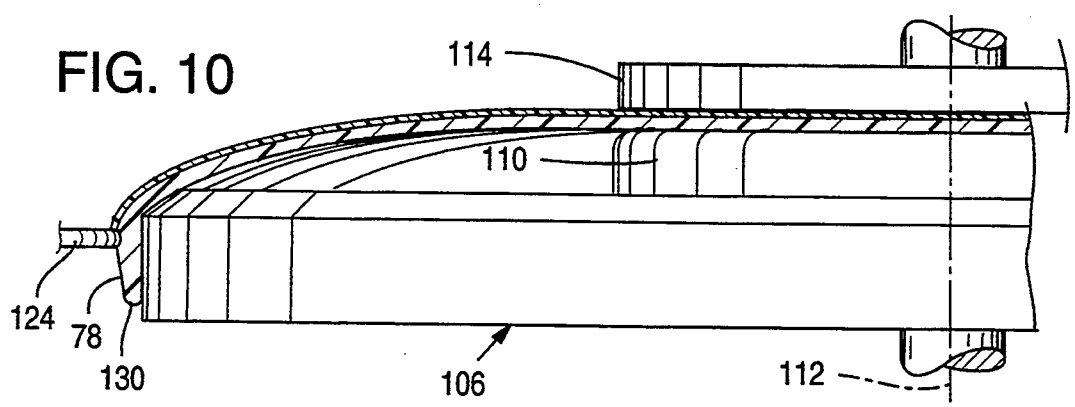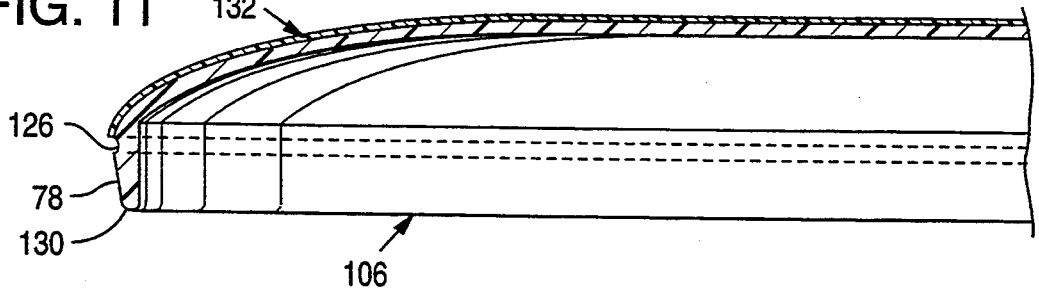

FLYING DISC WITH LAMINATE SURFACING

BACKGROUND AND SUMMARY OF THE INVENTION

This invention relates to a flying saucer or disc which is an aerodynamic toy and which is placed in flight by appropriate throwing of the disc by the user of the toy. A disc of this description is illustrated and described in prior issued U.S. Pat. No. 3,359,678, entitled FLYING SAUCER, issuing December of 1967.

Difficulties have been experienced in the past in incorporating decorative designs or other forms of images on the exposed convex and upper surface characterizing the usual flying disc. In the past, decorative effects have been placed on this disc surface, either with painting, or by the application of a suitable decal or decals. Neither of these approaches has been entirely satisfactory. Decorative coatings applied in this way are subject to chipping or scraping and other types of wear during use of the toy, and clear sharp images or patterns in bright distinctive colors, with the appearance of being a permanent part of the disc surface, have generally not been producible.

In general, this invention concerns a new and improved process for making a disc which incorporates, as a covering over the upper convex surface of the disc, a laminate layer integrated throughout its expanse with the plastic material forming the body of the disc.

Another object of the invention is to provide an improved form of flying disc which includes a decorative coating as part of a laminate layer extending over the convex upper surface of the disc.

In a particular and preferred embodiment of the invention herein disclosed, a laminate layer is prepared which includes an outer layer or lamina of a clear thermoplastic material, and an inner layer or lamina of thermoplastic material which lies against the outer layer. Interposed between the two lamina of material is imaging material forming the graphics or design which it is desired to incorporate in the final disc. During injection molding of the thermoplastic material which forms the body of the disc, a laminate sheet including two layers of thermoplastic material having imaging material sandwiched between the layers is positioned to extend within the interior of a mold cavity used in the injection process. The sheet spans the concave face of the mold cavity which shapes the convex side of the final disc. Molten or fused thermoplastic material is injected into the mold cavity against the side of the sheet which faces away from the convex side of the mold cavity. The injected material softens and distorts the sheet to force the sheet throughout its extent against the convex mold surface, and with cooling, a unitary body is formed of the hot injected material and the sheet which the material has contacted. The sheet and the bonded body which backs it up are removed as a unit from the mold. The residue of the sheet in the completed disc forms a laminate layer surfacing the disc.

In the preferred embodiment, this laminate layer is cut-away to produce a terminal edge for the layer adjacent an edge in the disc forming the perimeter of the disc. Preferably this terminal edge forms one side of a shallow groove prepared about the disc adjacent its perimeter. A clean appearance is imparted to the disc as a whole. With the edge of the laminate layer disposed slightly axially inwardly of the edge forming the perimeter of the disc, abrasion—or scratch—producing forces arising during use of the disc impact the edge of the disc rather than having a damaging effect on the edge of the laminate layer.

A further object of the invention, therefore, is to provide an improved flying disc which features a laminate layer forming a decorative covering for a convex external surface of the disc, where such layer terminates in an edge extending about the disc inwardly of an edge forming a perimeter of the disc.

More specifically, an object is to provide such a disc where the disc includes a shallow groove extending about the disc directly adjacent a perimetric edge in the disc, and where a graphics-imparting laminate layer has a terminal edge bounded by one side of this groove.

These and various other objects and advantages are obtained by the invention, which is described herein below in conjunction with the accompanying drawings, wherein:

BRIEF DESCRIPTION OF THE DRAWINGS

FIGS. 8, 9 and 10 illustrate, schematically, steps followed in trimming and further processing the disc to produce the final product; and FIG. 11 illustrates in cross-section a portion of a completed flying disc.

DESCRIPTION OF THE PREFERRED EMBODIMENT

Following the invention, a flying disc is prepared by injecting fused or molten thermoplastic material into a suitable mold having opposite internal mold surfaces shaped to form the disc. Prior to the injection of the molded material, a laminar sheet is suitably positioned with the sheet extending across the interior of the mold. Hot, injected material is forced against this sheet, causing such to be softened and pressed in conforming relation against a convex mold surface in the mold.

The sheet described is a laminated product which includes an outer layer or lamina preferably of clear thermoplastic material, such as a clear polyolefin, and an inner layer or lamina of thermoplastic material suitably adhered to the outer layer, with this inner layer being preferably white or opaque.

Figure 1:
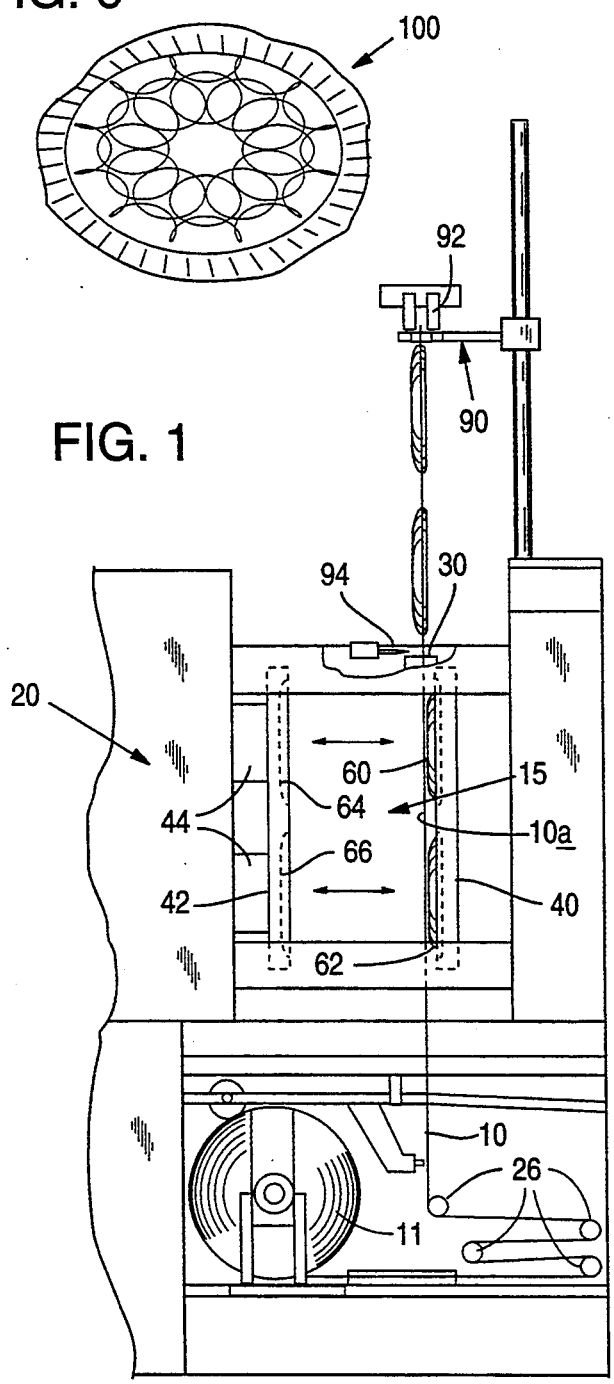
FIG. 1 is a side elevation, in simplified form, illustrating apparatus usable in preparing the flying disc of the invention, and illustrating how a laminar sheet which incorporates the coloring and graphics desired to be imparted to a disc exterior is trained in a course extending upwardly between mold pieces used in molding the discs.
Figure 2:
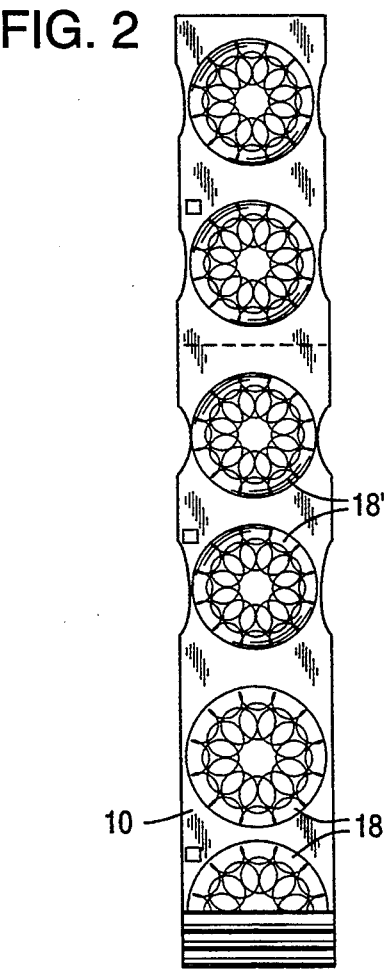
FIG. 2 is a view looking at a face of the laminar sheet, and illustrating the distortion which occurs when the sheet becomes an integral part of molded disc bodies produced following the invention.
Figure 5:
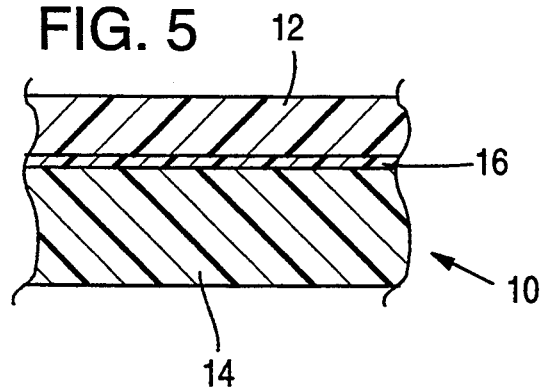
FIG. 5 is a view, greatly enlarged, of portions of a laminar sheet utilized in preparing the laminate layer in the disc.

In the drawings, and referring more particularly to FIGS. 1 and 2, a laminar sheet of this description is illustrated at 10. A length of the sheet is stored in a roll 11. As best seen in FIG. 5, which is a greatly enlarged cross-sectional view of the sheet, the laminar sheet includes an outer clear layer 12, and an inner opaque layer, preferably white, designated at 14. Both are composed of a thermoplastic, such as, for example, a polyolefin, and more particularly polyethylene. It has been found preferable in following the invention to have inner layer 14 of somewhat greater thickness in the outer layer. By way of example, and in a particular manufacture, the outer clear layer might have a thickness of 2 mils, whereas inner layer 14 might have a thickness of 4 mils. In most instances, the overall thickness of a sheet would not exceed about 10 mils.

In the usual manufacture, the polyolefin layers just described might have a softening point in the range of 180° to 220° F. Sandwiched between layers 12 and 14 of the laminar sheet, is graphic imaging material, shown in FIG. 5 at 16. In FIG. 5, the thickness of this layer is somewhat exaggerated due to the necessity of illustrating the layer, as it should be understood that in most instances this layer will have slight thickness relative to layers 12 and 14. Layer 16 imparts coloring and design to the laminar sheet, which is viewable on viewing the layer through outer clear layer 12. Layer 14, which is preferably white, forms a back-up for this imaging material, and by having this layer white, optimum brightness and sharpness has found to be imparted to the images and coloring portrayed by the imaging layer.

Imprinting or placement of graphic imaging material at the interface between the two film layers may be done using any of several conventional processes for printing on polyethylene. Exemplary of such a process is a process known as corona treating for printing. In corona treating, an electric discharge temporarily alters the surface molecules of the polyethylene film, allowing inks compatible with the process to adhere to the film. Following the instant invention, preferably inks are employed with ultraviolet inhibitors which resist fading. Any desired pattern can be imprinted on the face of this sheet at the interface between the two sheet layers, and by way of example, such a pattern may include words, logos, stylized graphics, color sweeps, etc. Obviously, different colors can be used in the process. If the graphics are applied to the undersurface of outer layer 12, the graphics are reverse-printed because they will be viewed through this film layer. With the graphics printed on the upper surface of inner layer 14, the graphics are not reverse-printed, as they are viewed directly.

In FIG. 1, injection molding apparatus is illustrated in simplified form generally at 20. In this apparatus, roll 11 of the sheet is rotatably supported near the base of the machine. The sheet 10 extends outwardly from this roll and thence about training cylinders such as those shown at 26. From the training cylinders, the sheet extends upwardly in a vertical expanse shown at 10a, and this expanse extends vertically upwardly through a mold forming section 15. Above section 15, vertical expanse 10a is held by a releasable clamp means 30.

Describing very generally mold forming section 15, such includes a pair of mold pieces, and in particular, a fixed mold piece 40, which has a fixed or stationary position in the apparatus, and a movable mold piece 42, which is mounted for travel in the press section in a horizontal direction, as indicated by the arrows shown in FIG. 1. In FIG. 1, the movable mold piece is shown in a retracted position, or moved to the left and away from mold piece 40 by means including cylinders 44. Mold piece 42 is movable in FIG. 1 in a horizontal direction and to the right, to place it in a closed position for the mold forming section, which is with the mold piece lying directly against stationary or fixed mold piece 40.

In FIG. 2, images such as might be produced in the laminar sheet are illustrated by the circular patterns 18. Ordinarily a size of the pattern is selected which equals or slightly exceeds the surface area of the formed disc that the laminar sheet 10 is to cover. As will be Thereinafter apparent, the sheet of material is deformed somewhat by the action of molding a disc body thereagainst. This means that in a plan view (as seen in FIG. 2), a pattern which is an integral part of a disc has a somewhat small overall size, as demonstrated by patterns 18'.

In FIG. 1, fixed mold piece 40 is shown as having a pair of convex mold surfaces 60, 62 disposed one above the other. The movable mold piece is shown as having a pair of concave mold surfaces 64, 66 disposed one above the other. With positioning of movable mold piece 42 against mold piece 40, a concave mold surface such as mold surface 64 becomes positioned directly opposite but spaced slightly away from a convex mold surface such as convex surface 60, to form a mold cavity for the molding of one disc. At the same time, concave mold surface 66 becomes directly adjacent but spaced slightly away from convex surface 62 to form another mold cavity used in the injection molding of another disc. In other forms of the invention, a greater or lesser number of mold surfaces could be employed, as desired.

Describing how the mold forming section is used in the injection molding of discs, prior to a mold cycle, the mold pieces are moved away from each other by movement of mold piece 42 to the left to the position illustrated in FIG. 1. Sheet 10 is supported by means 30 whereby expanse 10a extends vertically upwardly in a region adjacent the fixed mold piece 40.

The movable mold piece is then moved toward the fixed mold piece, with movement of mold surfaces 64, 66 toward surfaces 60, 62. As such movement progresses, a convex mold surface, as exemplified by mold surface 60, contacts a portion of the sheet, and then on further advance of the movable mold piece, deflects this portion of the sheet in a distorted expanse extending in covering relation over the convex mold surface. On the movable mold piece being fully advanced toward the fixed mold piece, the sheet, in a region directly outwardly from cooperating concave and convex mold surfaces, becomes firmly clamped between the mold pieces. The convex mold surface of the fixed mold piece becomes positioned opposite but spaced slightly away from the concave mold surface in the movable mold piece. The opposed mold surfaces provide a mold cavity having a shape which conforms to the shape of tile disc to be produced. Prior to injection of molten plastic material, sheet 10 within this mold cavity extends as indicated by the dashed line 10d in FIG. 3.

After such positioning, the molten thermoplastic which forms the body of the throwing disc, such as molten polyethylene, is introduced to the mold cavity defined between cooperating convex and concave mold surfaces through a suitable inlet passage or sprue extending through tile fixed mold press and communicating with the mold cavity adjacent the center axis of the cavity. The molten plastic might have a temperature ranging from 350° to 400° F. which renders such freely flowable, and which has the effect, on contacting with the laminar sheet, of softening such sheet. Suitable conventional means is provided for venting the mold cavity during the introduction of injection molding material. After a short time interval, the cavity becomes completely filled with the injected material. The injected material forces the deformed thermoplastic laminar sheet 10 to a position directly against and conforming to a concave mold surface, as exemplified by surface 64. This is the condition of sheet 10 illustrated in solid lines in FIG. 3.

After filling of the mold cavity with hot injected plastic, and the forcing by such injected material by the laminar sheet snugly against the concave surface of a mold, the injected material cools to produce a solidified disc body of the injected material, and this disc body includes, as an integral part thereof, a laminate layer which is the residue of the laminar sheet.

Figure 3:
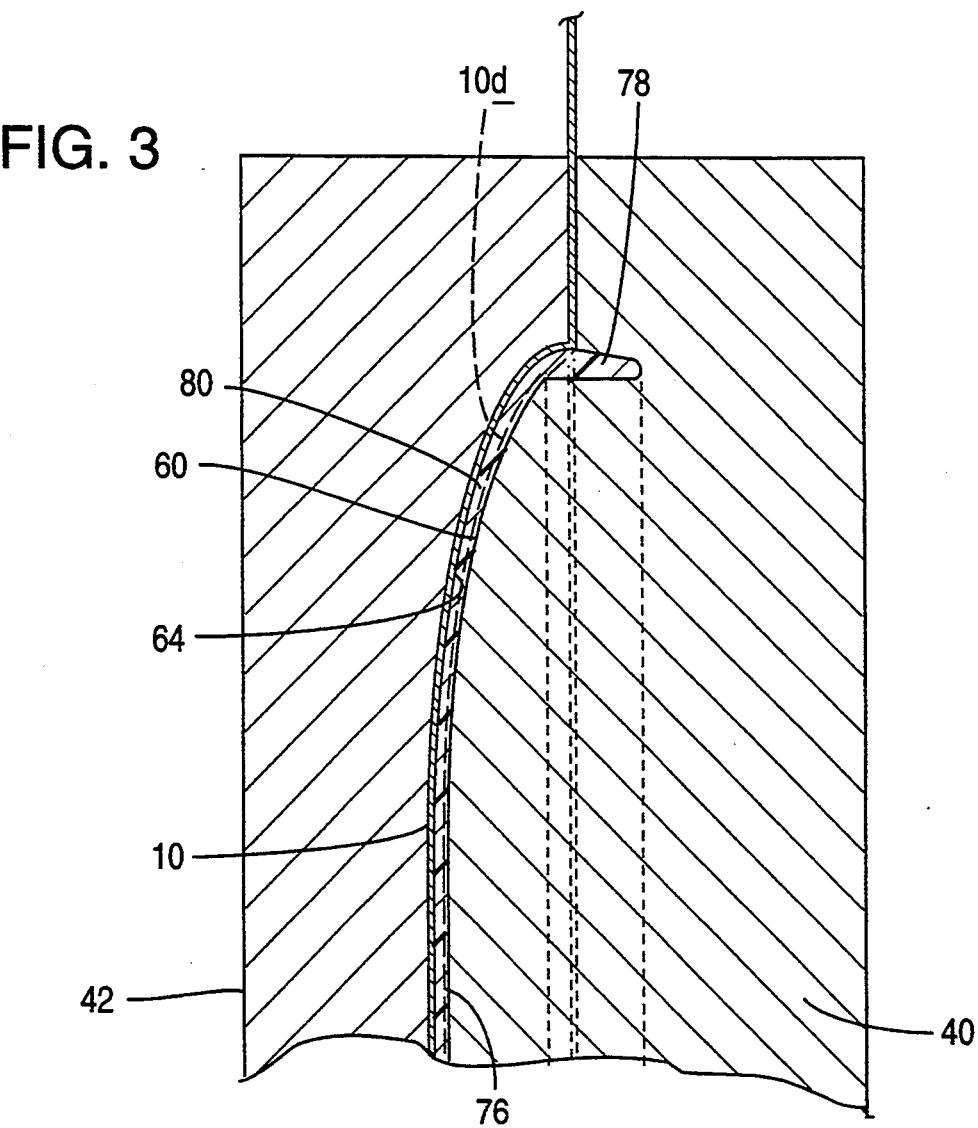
FIG. 3 is an enlarged, simplified view, illustrating portions of mold pieces used in molding a disc body as characterizes the present invention.

Referring to FIG. 3, the disc body includes what might be thought of as a substantially flat, circular central portion indicated in FIG. 3 at 76, and this central portion is substantially normal to the axis of the disc. The disc body further includes an annular rim portion 78 circumscribing the central portion 76 and extending generally parallel to the axis of the disc, or in an axial direction. The disc body further includes an annular transition portion 80 that extends in a continuous curving sweep and interjoins the central portion and the rim portion. It should be understood that in the disc body these various portions are all part of a unified whole, there being no sharp line of demarcation between the portions described.

Figure 4:
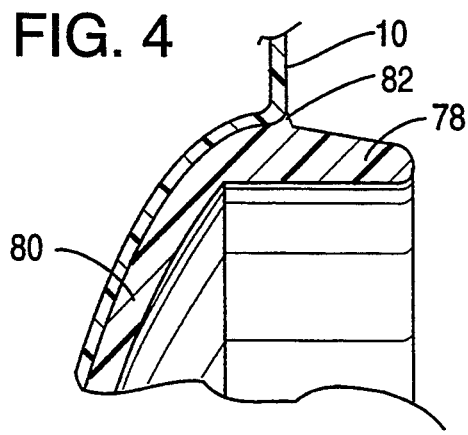
FIG. 4 is a view, somewhat enlarged, illustrating part of a rim and adjacent portions of a disc, and how a laminar sheet which forms an overlay in the disc projects away from the rim at the location of a part line formed in the rim.

The laminar sheet extends outwardly from each mold cavity in a region between the fixed and movable mold pieces. As seen in FIG. 4, in producing a disc body, a slight protruding ridge 82 is formed at the part line between the two mold pieces, in a circumferential zone extending about rim portion 78. Because of its relatively small size, the ridge has only been illustrated in FIG. 4 which is a greatly enlarged illustration of the disc and its covering.

At the conclusion of a mold cycle, movable mold piece 42 is retracted to expose the just formed disc bodies with their laminar overlay layers, and portions of the laminar sheet extending downwardly from the lowermost disc body and the lower mold cavity and extending upwardly to a severed edge held by means 30 disposed above the mold pieces. The disc bodies and their overlays may then be dislodged from the stationary mold piece, and moved upwardly out of the mold forming section 15, using a suitable means which grips the severed edge of the laminar sheet and then pulls the sheet upwardly together with the disc bodies, to clear the mold forming section and to place a fresh expanse of the laminar sheet in operative position between the fixed and movable mold pieces. In FIG. 1, this gripping and lifting means has been indicated schematically at 90, and it should be understood that the lifting means may take any of a number of different forms. With the severed edge raised, the end of the sheet is transferred to a movable gripper 92, such again being indicated only in schematic form. A cutter is shown at 94. With the sheet and its disc bodies raised, means 30 is actuated to clamp onto the sheet adjacent the location of cutter 94, and the cutter actuated to cut the sheet and produce a cut edge at the location of the cutter.

This separates a section of sheet 10 which has the disc bodies attached thereto from the remainder of the sheet extending down into mold forming section 15. Movable gripper 92 may then be actuated to transport the section of the laminar sheet together with the disc bodies laterally outwardly of the apparatus. This enables lifting means 90 to be lowered whereby such may then be actuated to clamp onto the severed edge produced by the cutter 94, in readiness to raise the sheet and attached disc bodies at the end of a subsequent molding cycle.

Figure 6:
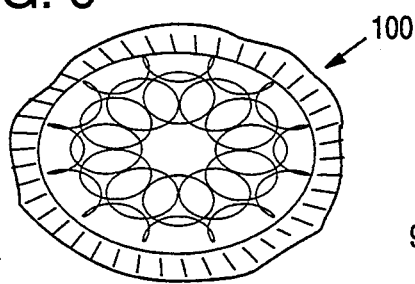
FIG. 6 is a perspective view of a disc with attached remnants of a laminar sheet, prior to trimming of the product.

After removal from the molding apparatus, excess laminar sheet material extending outwardly from a molded disc body may be roughly trimmed away as with a knife. This produces the roughly trimmed unit 100 illustrated in FIG. 6, comprising a molded disc body together with an overlay and roughly trimmed edges of a sheet.

Figure 7:
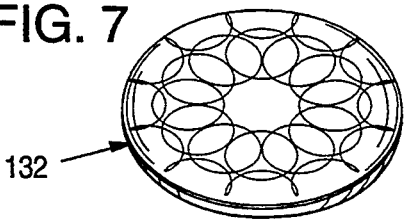
FIG. 7 is a perspective view of a completed disc.

Roughly trimmed unit 100 is converted into a final throwing disc (shown at 132 in FIGS. 7 and 11) following the procedures illustrated in FIGS. 8-10.

Referring to these figures, unit 100 after leaving the molding apparatus section is subjected to steps to stress-relieve the unit. Typically such stress relieving of the unit includes heating and cooling under controlled conditions. With the disc body and its integrated overlay stress-relieved, the unit is processed to remove excess sheet material protruding at the periphery of the unit, and to place a shallow groove around the perimeter of annular rim 78, in the process to be described.

Further explaining, the unit is placed on a rotatable turntable indicated in FIGS. 8-10 generally at 106. The turntable includes an annular collar portion 108 shaped snugly to support the inside of the disc directly adjacent its rim 78, and further includes a platform section 110 projecting above the level of the collar portion and centered with respect to rotation access 112 of the turntable.

A unit 100 is placed on the turntable with its rim 78 embracing collar portion 108. The center portion of the disc in the unit is positioned to rest on platform 110. An axially shiftable clamp 114 disposed above the turntable and rotatable together with the turntable is then actuated to come down against the top surface of the unit as so positioned. This securely mounts the roughly cut unit on the turntable in readiness for processing.

After this mounting the unit is trimmed, essentially at its part line (not illustrated in FIG. 9 because of the size of the drawing), by a suitable knife, such as the one shown at 120 which is actuated to come down against the periphery of the unit as the unit is rotated by the turntable that supports it.

This readies this unit for the manufacture of a shallow groove about its periphery. The groove finally trims the overlay edge, eliminates the part line, and gives a finished appearance to the disc.

In grooving the unit, the knife is retracted and a grooving cutter 124 advanced to contact the periphery of the disc. Rotation of the disc and turntable with the cutter so advanced results in the production of a groove 126 extending about the disc, in the outer surface of its annular rim 78. FIG. 11 is a cross-section illustrating disc 132 after the preparation of a groove therein and after such has been removed from the turntable.

As just described, the method of the invention comprises providing a pair of cooperating mold pieces where these mold pieces have respective mold surfaces of convex and concave shape. The mold pieces are placed in operative position with their mold surfaces opposite and spaced from each other thus to define a mold cavity. The laminar sheet 10 is positioned with such extending across this mold cavity.

The fused or molten thermoplastic material which forms the body of the disc is injected into the mold cavity through a sprue or inlet opening which extends through the mold piece having the convex mold surface. The thermoplastic material fills the mold cavity with softening of the laminar sheet, and forcing of the sheet into snug relationship against the convex mold surface of a mold piece. With subsequent cooling, the injected material and the laminar sheet form a unified element comprising the disc body of polyethylene and the laminate layer which extends in covering relation over its convex outer surface, and also downwardly about a portion of the rim in the flying disc.

In the flying disc that is produced, the thermoplastic laminate layer in the transition portion of the disc extends as a sweep with curvature both in a direction extending radially of the disc and in a direction extending circumferentially about the axis of the disc. In the completed disc, the concavo-convex disc body that is formed by the injected material has a convex side facing the overlying laminate layer that provides support and backs up this layer.

Because the terminal edge of tile laminate overlay is adjacent but disposed slightly away from tile terminal edge of the disc proper (edge 130 in FIG. 11), the edge of the overlay is not subjected to tile pounding, abrasion, scratching and other rough treatment to which the terminal edge of the disc might be expected to be exposed during use of the disc.

While a particular embodiment of the invention has been described, it is appreciated that variations and modifications are possible, both in the method of manufacture, and in the type of disc produced.

It is claimed and desired to secure by Letters Patent:

1. A throwable flying disc having a circular perimeter and opposite concave and convex sides bounded by said perimeter, comprising:
    a thermoplastic laminate layer including a clear outer lamina and an inner lamina and imaging material sandwiched between the inner and outer lamina, the layer surfacing the convex side of the disc with the outer lamina of the layer disposed outwardly on the disc and the layer extending in curved fashion in directions extending out radially and circumferentially on the convex side of the disc,
    a concavo-convex disc body of thermoplastic material having a convex side that provides support for, is united to, and backs up the laminate layer, and
    said body being the injection molded product formed by injecting molten thermoplastic material into a mold cavity configured to shape the body in its concavo-convex shape, the laminate layer being the residue of a laminar sheet that during injection is positioned in the mold cavity so that molten material travels against the sheet to force the sheet against a concavely curved side of the mold cavity that shapes the convex side of the disc, the laminar sheet layer during injection stretching to conform to the concavely curved side of the mold cavity and under the conditions of the injection uniting with the molten material injected thereagainst.

2. The flying disc of claim 1, wherein the disc body has an annular rim portion located adjacent said perimeter and extending in an axial direction adjacent said perimeter, and the laminate layer terminates in an edge for the layer which extends along said rim portion.

3. The flying disc of claim 2 wherein said disc body has a shallow groove extending along said rim portion on the exterior of the rim portion, and wherein said edge of the laminate layer bounds a side of said groove.

4. The flying disc of claim 1, wherein the disc body has an annular rim portion located adjacent said perimeter and extending in an axial direction, the rim portion has an edge forming an edge of the flying disc, the rim portion has on its exterior a groove extending circumferentially on the disc body in a region spaced axially from the edge of the rim portion, and the side of said groove defines an edge bounding said laminate layer.

5. A flying disc having a circular central portion and an annular rim portion circumscribing the central portion, the central portion extending substantially normal to the axis of the disc and the rim portion extending generally in an axial direction and the disc further including an annular transition portion extending in a continuously curving sweep from the periphery of the central portion to the rim portion, the disc having an outer convex side presented by the exterior of the central portion and transition portion,
    a thermoplastic laminate layer surfacing the outer convex side of the disc and a thermoplastic body for the disc underlying the laminate layer,
    the laminate layer terminating in an edge of circular outline positioned on the rim portion of the disc,
    the laminate layer including an outer clear layer and an inner relatively opaque layer and imaging material sandwiched between the outer and the inner layers and the laminate layer being the residue of a flat laminar sheet which distorts to a convexly curved shape surfacing the central and transition portions of the disc during injection molding of the body against a side of the sheet, the residue of the sheet uniting with the body formed by the injection molding,
    wherein the rim portion is bounded by an edge as the outer perimeter of the disc, a groove extends around the outside of the rim portion disposed axially inwardly of the edge of the rim portion, and said laminate layer has an edge bounded by said groove.

6. A method of making a flying disc of generally concavo-convex configuration and of circular outline, the method comprising:
    providing a pair of cooperating mold pieces with one mold piece having a concave mold surface for shaping the outer convex side of the disc and the other mold face having a convex mold surface for shaping the inner concave side of the disc,
    positioning the mold pieces in operative position and with their mold surfaces opposite and spaced from each other to define a mold cavity conforming to the shape of the disc, and positioning a laminar sheet between the mold pieces with the sheet spanning the mold cavity, the sheet having an outer lamina of clear thermoplastic material facing the concave mold surface and an inner lamina of opaque thermoplastic material facing in the opposite direction and further including imaging material interposed between the two laminae,
    injecting into the mold cavity against the inner layer of the laminar sheet hot molten thermoplastic material and with injection of material filling the mold cavity with the forming of a laminate layer that throughout its extent fits snugly against the concave mold surface, the injecting of the material and subsequent solidification with cooling producing a unified body of injected material and a residue of the laminar sheet and the residue of the laminar sheet forming a laminate layer surfacing a convex side of said body, removing the formed body together with its unified laminate layer from the mold, and trimming the laminate layer to produce a trimmed edge of the layer extending in a circular course inwardly from the perimeter of the disc.

* * * * *